United States Patent
Park

(10) Patent No.: US 11,192,532 B2
(45) Date of Patent: Dec. 7, 2021

(54) VEHICLE CONTROL SYSTEM, METHOD OF CONTROLLING THE SAME, AND BREAKING DEVICE

(71) Applicant: MANDO CORPORATION, Pyeongtaek-si (KR)

(72) Inventor: In Hye Park, Yongin-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 53 days.

(21) Appl. No.: 16/426,404

(22) Filed: May 30, 2019

(65) Prior Publication Data
US 2019/0366993 A1 Dec. 5, 2019

(30) Foreign Application Priority Data
May 30, 2018 (KR) .................. 10-2018-0061955

(51) Int. Cl.
*B60T 8/1755* (2006.01)
*B60W 30/02* (2012.01)
(Continued)

(52) U.S. Cl.
CPC ....... *B60T 8/17552* (2013.01); *B60W 30/025* (2013.01); *B60W 30/18127* (2013.01);
(Continued)

(58) Field of Classification Search
CPC ............. B60T 8/17552; B60W 30/025; B60W 30/18127; B60W 40/101; B60W 2422/70; B60W 2520/26
See application file for complete search history.

(56) References Cited

U.S. PATENT DOCUMENTS 8,788,144 B2 7/2014 Krueger et al.
10,384,669 B2 * 8/2019 Cho .................. B60W 10/08
(Continued)

FOREIGN PATENT DOCUMENTS

EP 3135551 A1 3/2017
EP 3225453 A1 10/2017
(Continued)

OTHER PUBLICATIONS

Danny Maynor: "VW eGolf Regenerative Driving Modes", Youtube, Jan. 4, 2015 (Jan. 4, 2015), p. 1, XP054979485, Retrieved from the Internet, URL:https://www.youtube.com/watch?v=MYqBGfN6thE.
(Continued)

*Primary Examiner* — Tyler J Lee
*Assistant Examiner* — Yufeng Zhang
(74) *Attorney, Agent, or Firm* — Hauptman Ham, LLP

(57) ABSTRACT

Disclosed herein is a vehicle control system capable of improving driving stability and providing safe fun driving to a driver by varying and controlling a regenerative braking torque generated by a motor during coasting. The vehicle control system according to an embodiment of the disclosure includes: a motor configured to provide a driving force to a wheel; a wheel sensor configured to detect a rotational speed of the wheel; and a controller configured to control the motor to generate a first regenerative braking torque during coasting, and to control the motor to generate a second regenerative braking torque lower than the first regenerative braking torque when a wheel slip of the wheel is detected based on an output of the wheel sensor.

5 Claims, 5 Drawing Sheets

(51) Int. Cl.
*B60W 30/18* (2012.01)
*B60W 40/101* (2012.01)

(52) U.S. Cl.
CPC ....... *B60W 40/101* (2013.01); *B60W 2422/70* (2013.01); *B60W 2520/26* (2013.01)

(56) References Cited

U.S. PATENT DOCUMENTS

| | | | |
|---|---|---|---|
| 2012/0074768 A1* | 3/2012 | Naito | ................ B60L 7/14 303/3 |
| 2014/0081498 A1 | 3/2014 | Weng et al. | |
| 2017/0282926 A1* | 10/2017 | Hashizaka | ................ B60L 7/14 |
| 2018/0093571 A1 | 4/2018 | Hall et al. | |

FOREIGN PATENT DOCUMENTS

| | | |
|---|---|---|
| JP | 2014073709 A | 4/2014 |
| JP | 2015104149 A | 6/2015 |
| KR | 10-0957309 B1 | 5/2010 |
| KR | 10-2014-0079158 A | 6/2014 |

OTHER PUBLICATIONS

Extended European Search Report dated Jul. 8, 2019, corresponding to European Application No. 191772441.1.

* cited by examiner

VEHICLE CONTROL SYSTEM, METHOD OF CONTROLLING THE SAME, AND BREAKING DEVICE

CROSS-REFERENCE TO RELATED APPLICATION(S)

This application is based on and claims priority under 35 U.S.C. § 119 to Korean Patent Application No. 10-2018-0061955, filed on May 30, 2018 in the Korean Intellectual Property Office, the disclosure of which is incorporated by reference in its entirety.

TECHNICAL FIELD

Embodiments of the disclosure relate to a vehicle control system for controlling a regenerative braking torque generated by a motor during coasting, and a method of controlling the vehicle control system.

BACKGROUND

In modern society, vehicles are the most common means of transportation and the number of people using vehicles is ever increasing. The development of vehicle technologies is changing and facilitating traveling over long distances with increased convenience.

The vehicles include motor vehicles (conventional engine-driven cars) driven with mechanical power produced by burning fuel oil, such as gasoline and diesel, and eco-friendly vehicles driven by electrical power so as to reduce the amount of harmful fuel emissions and increase fuel efficiency.

The eco-friendly vehicles include electric vehicles having a rechargeable power supply comprised of a battery and a motor, rotating the motor with electricity charged in the battery, and driving the wheels using the rotation of the motor and hybrid vehicles and hydrogen fuel cell vehicles having an engine, a battery, and a motor and driven by controlling the mechanical power of the engine and the electrical power of the motor.

The hybrid vehicles are driven in an Electric Vehicle (EV) mode using only the motor power, in a Hybrid Electric Vehicle (HEV) mode using both the engine power and the motor power, or in a regenerative braking mode charging the battery by recovering the braking energy from braking or inertial energy from coasting by inertia through a generating operation of the motor.

On the other hand, the vehicles may be provided with a brake system that decelerates or stops a vehicle speed when necessary while the vehicles are driving. The brake system may be also provided in the eco-friendly vehicles employing the motor, and various techniques for controlling a rotation torque of a wheel generated by the brake system are being developed.

SUMMARY

Therefore, it is an aspect of the disclosure to provide a vehicle control system capable of improving driving stability and providing safe fun driving to a driver by varying and controlling a regenerative braking torque generated by a motor during coasting, and a method of controlling the vehicle control system.

Additional aspects of the disclosure will be set forth in part in the description which follows and, in part, will be obvious from the description, or may be learned by practice of the disclosure.

In accordance with an aspect of the disclosure, a vehicle control system includes: a motor configured to provide a driving force to a wheel; a wheel sensor configured to detect a rotational speed of the wheel; and a controller configured to control the motor to generate a first regenerative braking torque during coasting, and to control the motor to generate a second regenerative braking torque lower than the first regenerative braking torque when a wheel slip of the wheel is detected based on an output of the wheel sensor.

The vehicle control system may further include: an accelerator pedal configured to receive an acceleration command from a driver; and a brake pedal configured to receive a brake command from the driver. The controller may control the motor to generate the first regenerative braking torque when the acceleration command and the brake command are not received.

The vehicle control system may further include: an inputter configured to receive a regenerative braking level from a driver. The controller may determine a magnitude of the first regenerative braking torque based on the regenerative braking level.

The controller may determine a magnitude of the second regenerative braking torque based on the braking efficiency.

The controller may determine the wheel slip based on a result of comparing a wheel slip value calculated based on the rotational speed of the wheel with a predetermined reference value.

The reference value may be determined based on at least one of the vehicle speed, the regenerative braking level, and a state of a road surface.

In accordance with another aspect of the disclosure, a method of controlling a vehicle control system includes: rotating a wheel by a motor; generating a first regenerative braking torque by the motor during coasting; detecting a rotational speed of the wheel during coasting; and generating a second regenerative braking torque lower than the first regenerative braking torque during coasting by the motor when a wheel slip is detected based on an output of the wheel sensor.

The generating of the first regenerative braking torque may include generating the first regenerative braking torque when an acceleration command and a brake command are not received.

The method may further include: receiving a regenerative braking level from a driver. The generating of the first regenerative braking torque may include determining a magnitude of the first regenerative braking torque based on the regenerative braking level.

The generating of the second regenerative braking torque may include determining a magnitude of the second regenerative braking torque based on the braking efficiency.

The detecting of the wheel slip based on an output of the wheel sensor may include determining the wheel slip based on a result of comparing a wheel slip value calculated based on the rotational speed of the wheel with a predetermined reference value.

The reference value may be determined based on at least one of the vehicle speed, the regenerative braking level, and a state of a road surface.

In accordance with another aspect of the disclosure, a braking device of braking a vehicle including a motor configured to drive a wheel and a driving device configured to control the motor, the braking device includes: a wheel sensor configured to detect a rotational speed of the wheel; and a controller configured to receive information about a first regenerative braking torque from the driving device during coasting, to determine a wheel slip of the wheel based on an output of the wheel sensor, and to transmit information about a second regenerative braking torque to the driving device such that the motor generates the second regenerative braking torque lower than the first regenerative braking torque in response to the determination of the wheel slip.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
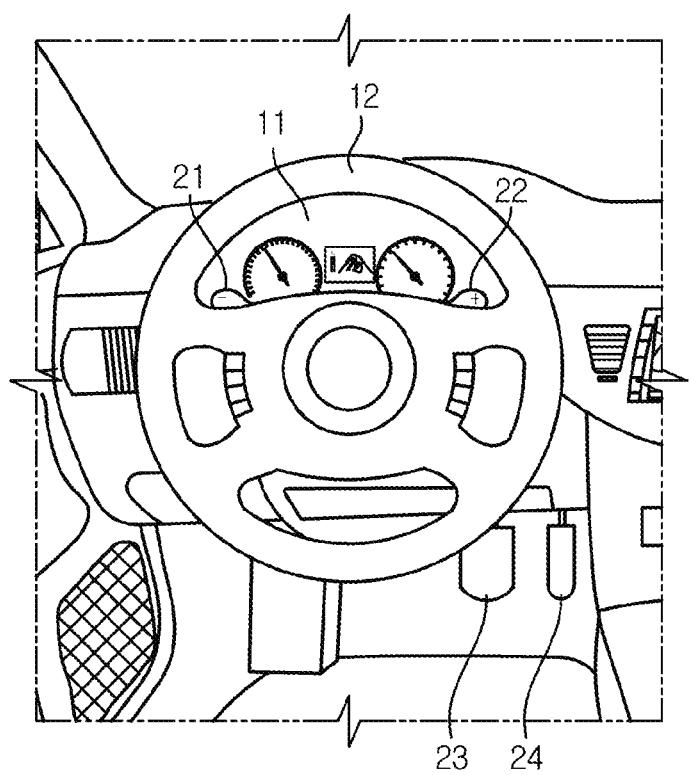
FIG. 1 is a view illustrating a part of a vehicle in which a vehicle control system according to embodiments of the disclosure is installed.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle and embodiments of the disclosure will now be described with reference to the accompanying drawings.

Figure 2:
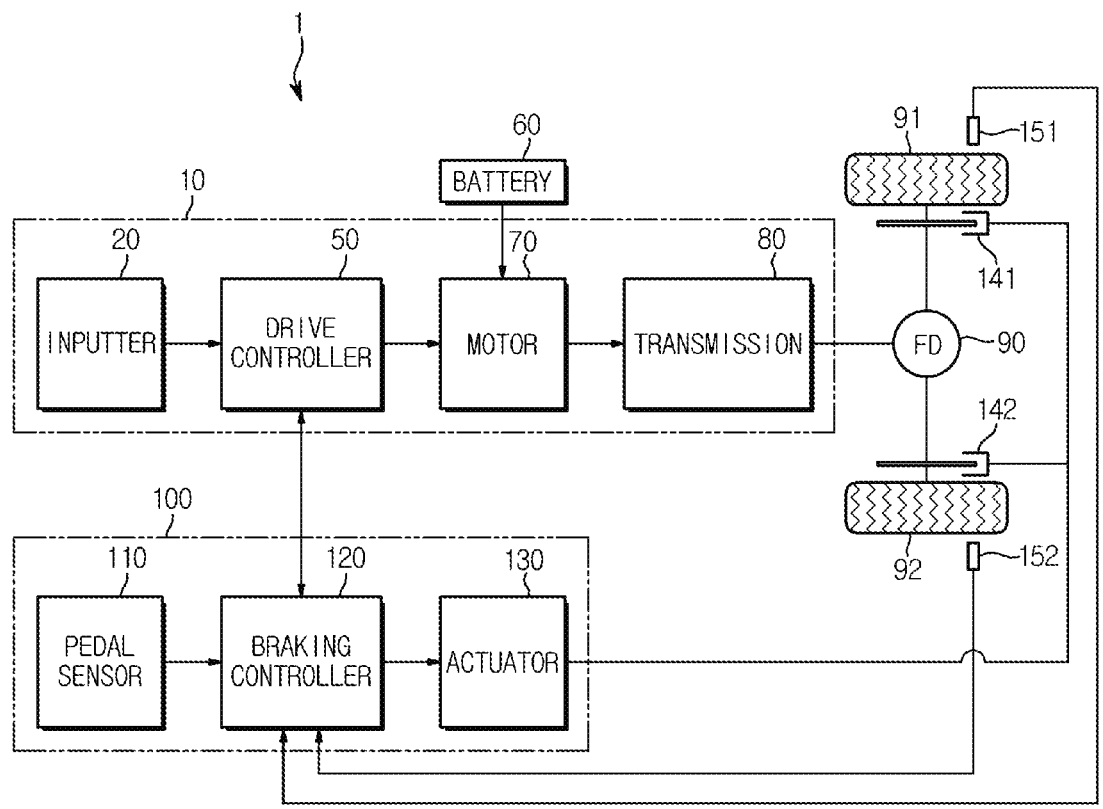
FIG. 2 is a control block diagram of the vehicle control system according to embodiments of the disclosure.
Figure 3:
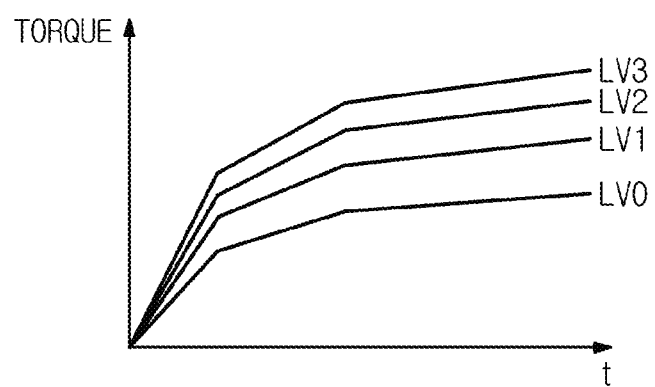
FIG. 3 is a view illustrating a regenerative braking level during coasting.
Figure 4A:
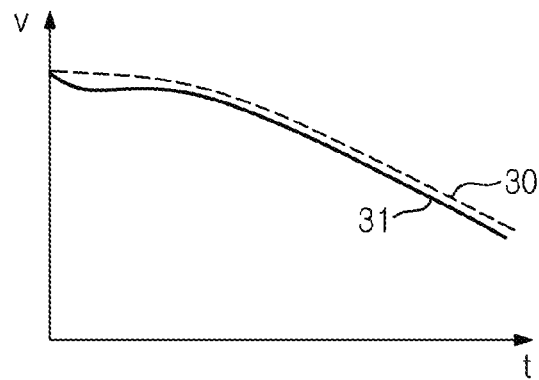
FIG. 4A, FIG. 4B & FIG. 4C are a graph illustrating a method of controlling the vehicle control system according to embodiments of the disclosure.
Figure 4B:
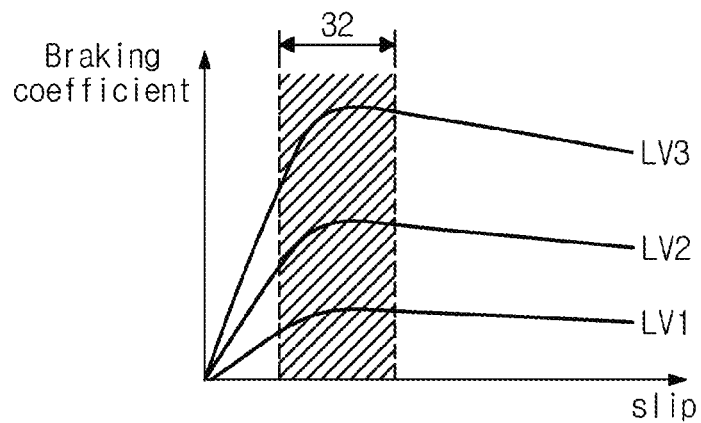
Figure 4C:
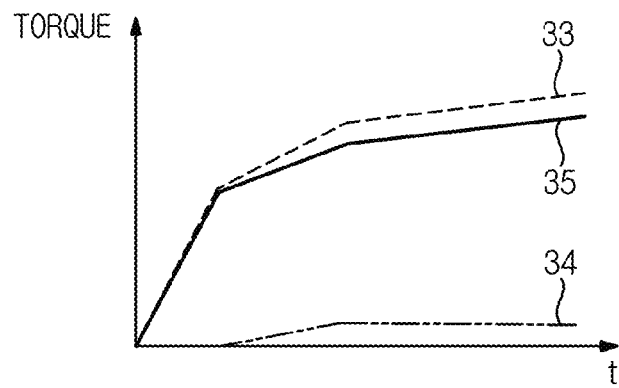

FIG. 1 is a view illustrating a part of a vehicle in which a vehicle control system according to embodiments of the disclosure is installed, FIG. 2 is a control block diagram of the vehicle control system according to embodiments of the disclosure, FIG. 3 is a view illustrating a regenerative braking level during coasting, and FIG. 4A, FIG. 4B & FIG. 4C are a graph illustrating a method of controlling the vehicle control system according to embodiments of the disclosure.

Referring to FIGS. 1 to 4C, a steering wheel 12, a cluster 11, which is provided toward the front of an eco-friendly vehicle from the steering wheel 12 and which displays operation information of the eco-friendly vehicle, a dashboard connected to the cluster 11 and provided with various devices for operating the eco-friendly vehicle, and the like may be provided around a seat in which the driver is seated.

For example, various devices provided on the dashboard may include an Audio Video Navigation (AVN) device or a ventilation hole connected to an air conditioner and various input/output devices in a center fascia, which is a central area of the dashboard.

The cluster 11 may display a current state and operation information of the vehicle, and may be provided with various display devices for this purpose.

The steering wheel 12 may control the direction of wheels 91 and 92, and the driver may control driving stability through the steering wheel 12 when a wheel slip occurs.

Paddle shifters 21 and 22 may be provided on the steering wheel 12 toward the cluster 11.

The paddle shifters 21 and 22 may receive an input command related to a regenerative braking level during coasting, which can control the magnitude of a regenerative braking torque during coasting, from the driver.

Generally, an inertia driving torque may refer to a braking torque provided to the wheels 91 and 92 through an engine and a transmission of the vehicle in a state in which an accelerator pedal 22 and a brake pedal 23 are not depressed. In a vehicle provided with an internal combustion engine, the braking torque during coasting may be controller according to the characteristics of a converter control of an automatic transmission.

In the eco-friendly vehicle that does not have the engine and uses a motor 70 as a power source, the regenerative braking torque during coasting becomes zero. However, the eco-friendly vehicle may generate the regenerative braking torque during coasting to improve fuel economy, giving the driver a feeling of driving similar to the vehicle provided with the internal combustion engine.

The wheels 91 and 92 may move the vehicle through rotation. In FIG. 2, only the first wheel 91 and the second wheel 92 provided on the right and left sides of the eco-friendly vehicle are illustrated as the wheels 91 and 92, respectively. However, depending on the type of vehicle, four wheels or more may be provided.

To generate the regenerative braking torque during coasting, the vehicle control system 1 includes a driving device 10 and a braking device 100.

The driving device 10 may include an inputter 20 for receiving the input command related to regenerative braking during coasting from the driver, the motor 70 for receiving an electric energy from a battery 60 and providing driving force to the wheels 91 and 92, a transmission 80 for transmitting a rotational motion of the motor 70 to the wheels 91, 92, and a drive controller 50 for controlling the above-described configuration.

Particularly, the inputter 20 may receive various input commands related to regenerative braking during coasting from the driver.

The inputter 20 may receive the input command related to the regenerative braking level during coasting. For example, the inputter 20 may transmit the regenerative braking level during coasting to the drive controller 50 based on an electrical command transmitted by the paddle shifters 21 and 22. A detailed description of the regenerative braking level during coasting will be described later.

The battery 60 may produce power with a high-tension current, and supply the power to the motor 70. In addition, the battery 60 may supply the power to various electric devices included in the eco-friendly vehicle provided with the vehicle control system 1 as well as the vehicle control system 1.

The battery 60 may also be charged by receiving the power generated from the motor 70 or a hybrid starter generator (HSG) provided in an eco-friendly vehicle.

The motor 70 may be supplied with the power from the battery 60 as the power source for providing a driving force to the wheels 91 and 92 included in the vehicle control system 1.

The rotational speed of the motor 70 may be controlled based on a displacement of an accelerator pedal 24. For example, when an accelerator pedal sensor (not shown) detects the displacement of the accelerator pedal 24, the drive controller 50 may determine the number of revolutions of the motor 70 corresponding to the magnitude of the displacement of the accelerator pedal 24, and control the motor 70.

The motor 70 may operate as a generator in accordance with a regenerative braking mode and may charge the battery 60.

The transmission 80 may transmit the rotational motion of the motor 70 to the wheels 91 and 92.

When the transmission 80 is provided between the motor 70 and the engine provided in the eco-friendly vehicle, the transmission 80 may be a Dual Clutch Transmission (DCT) that uses two clutches to manipulate a gear.

In the vehicle control system 1, the transmission 80 may further include a final reduction and differential gear (FD) 90 for converting revolutions per minute (rpm) of the motor 70 based on the displacement of the accelerator pedal 24.

Particularly, the wheels 91 and 92 are driven by the eco-friendly vehicle, and the FD 90 may transmit the driving torque generated by the motor 70 to the wheels 91 and 92.

The drive controller 50 may control the motor 70 to generate a first regenerative braking torque based on the regenerative braking level during coasting transmitted by the inputter 20. That is, the drive controller 50 brakes the vehicle based on a first inertia driving torque in the coasting state in which there is no acceleration command and brake command from the driver.

As described above, the drive controller 50 may determine the first regenerative braking torque according to the regenerative braking level during coasting selected by the driver, and control the motor 70 to generate the first regenerative braking torque. At the same time, the drive controller 50 may transmit the first regenerative braking torque to the braking device 100. The drive controller 50 may also receive a second regenerative braking torque in response to the first regenerative braking torque from the braking device 100, and control the motor 70 to generate the second regenerative braking torque received from the braking device 100.

The drive controller 50 may include a communication module (not shown) communicating with other devices such as the braking device 100, a memory (not shown) storing an algorithm for controlling the driving device 10 or data about a program that implements the algorithm, and a processor (not shown) carrying out the aforementioned operation using the data stored in the memory. The communication module, the memory, and the processor may be implemented in separate chips. Alternatively, the communication module, the memory, and the processor may be implemented in a single chip.

In the graph of FIG. 3, an X axis represents a time, a Y axis represents a magnitude of the regenerative braking torque during coasting, and the unit is Nm.

Referring to FIG. 3, the driving device 10 applied to the eco-friendly vehicle may generate different magnitudes of the regenerative braking torque during coasting according to different regenerative braking levels during coasting. Also, the driving device 10 may control the motor 70 such that the regenerative braking torque reaches a predetermined constant magnitude.

The magnitude at which the regenerative braking torque during coasting reaches over time may be based on the regenerative braking level during coasting, and the regenerative braking level during coasting may be received from the driver. The driver may determine the regenerative braking level during coasting through the paddle shifters 21 and 22. The regenerative braking level during coasting may be increased by the right paddle shifter 22 and the regenerative braking level at the time of coasting may be decreased based on the input command transmitted from the left paddle shifter 21 of the seat on which the driver is seated.

The driving device 10 may control the motor 70 to generate the magnitude of the first regenerative braking torque based on the regenerative braking level during coasting transmitted from the driver.

On the other hand, the input command regarding the regenerative braking level during coasting is not necessarily transmitted only by the paddle shifters 21 and 22, but may also be transmitted through various buttons and input methods.

The braking device 100 may include a pedal sensor 110 for detecting the driver's braking intentions, calipers 141 and 142 for stopping the rotation of the wheels 91 and 92 through friction, an actuator 130 for controlling the calipers 141 and 142 through hydraulic pressure so as to stop the wheels 91 and 92, and a braking controller 120 for controlling the actuator 130 based on an output of the pedal sensor 110 and outputs of wheel sensors 151 and 152.

The pedal sensor 110 may be provided on the brake pedal 23, and may detect a position of the brake pedal 23 or a displacement of the brake pedal 23. When the driver presses the brake pedal 23 to stop the vehicle, the pedal sensor 110 may detect the position or displacement of the brake pedal 23 and transmit the electrical signal corresponding to the detected position or displacement to the braking controller 120.

The calipers 141 and 142 may stop the wheels 91 and 92 through friction. For example, the calipers 141 and 142 stop the rotation of the wheels 91 and 92 by grabbing a disk rotating together with the wheels 91 and 92 through the hydraulic pressure provided from the actuator 130.

The calipers 141 and 142 may include the first caliper 141 for stopping the first wheel 91 and the second caliper 142 for stopping the second wheel 92.

The wheel sensors 151 and 152 may measure the rotational speed of the wheels 91 and 92 and transmit the electrical signal corresponding to the rotational speed of the measured wheels 91 and 92 to the braking controller 120.

The wheel sensors 151 and 152 may include the first wheel sensor 151 for detecting the rotational speed of the first wheel 91 and the second wheel sensor 152 for detecting the rotational speed of the second wheel 92.

The actuator 130 may generate the hydraulic pressure for controlling the operation of the calipers 141 and 142 according to a braking control signal of the braking controller 120. In other words, the actuator 130 may generate the hydraulic pressure to allow the calipers 141 and 142 to stop the wheels 91 and 92, and provide the generated hydraulic pressure to the calipers 141 and 142.

The actuator 130 may independently generate the hydraulic pressure provided to the first caliper 141 and the hydraulic pressure provided to the second caliper 142. In other words, the actuator 130 may provide different hydraulic pressures to the first caliper 141 and the second caliper 142 to provide different braking forces to the first wheel 91 and the second wheel 92.

The actuator 130 may include a pump, a valve, and the like that operate according to the braking control signal of the braking controller 120. For example, the actuator 130 may include an inlet valve that allows or blocks the hydraulic pressure supply to the calipers 141 and 142, and an outlet valve that allows or blocks the hydraulic pressure drop of the calipers 141 and 142.

The braking controller 120 may control the actuator 130 in response to the output signal of the pedal sensor 110 and the output signal of the wheel sensors 151 and 152.

For example, the braking controller 120 may determine the movement (displacement) of the brake pedal 23 based on the pedal sensor 110 and control the actuator 130 to provide the hydraulic pressure corresponding to the movement (displacement) of the brake pedal 23 to the calipers 141 and 142.

The braking controller 120 may determine the wheel slip based on the difference between the output of the first wheel sensor 151 and the output of the second wheel sensor 152, and control the actuator 130 to stop the braking of the wheels 91 and 92 in response to the determination of the wheel slip. In other words, in response to the determination of the wheel slip, the braking controller 120 may control the actuator 130 to drop the hydraulic pressure of the calipers 141 and 142.

Also, the braking controller 120 may receive a current regenerative braking torque from the drive controller 50. In response to receiving the current regenerative braking torque, the braking controller 120 may determine the wheel slip based on the difference between the output of the first wheel sensor 151 and the output of the second wheel sensor 152.

Alternatively, the braking controller 120 may determine the wheel slip based on the difference between the vehicle speed and the output of the wheel sensors 151 and 152. For example, the braking controller 120 may calculate an average rotational speed (vehicle speed) based on the collected rotational speeds of the plurality of wheels, and determine the wheel slip based on the rotational speed and the vehicle speed.

When the wheel slip is out of a target control region, the braking controller 120 may determine the second regenerative braking torque to reduce the braking force of the current vehicle. The second regenerative braking torque may be calculated based on a degree of deviation of the wheel slip from the target control region (e.g., the difference between the wheel slip and a maximum value of the target control region), and the second regenerative braking torque may be less than the first regenerative braking torque generated by the drive controller 50.

FIG. 4A is for describing the wheel slip, FIG. 4B is for the target control region of the regenerative braking torque during coasting, and FIG. 4C is a graph for a result of a control method.

Referring to FIG. 4A, an X axis represents a time and a Y axis represents a speed.

For example, during coasting, the driving device 10 may control the motor based on the first regenerative braking torque.

Because the first regenerative braking torque is generated in a deceleration direction, a vehicle speed 30 of the eco-friendly vehicle decreases over time.

Also, while the vehicle speed 30 is decelerated by the first regenerative braking torque, the eco-friendly vehicle may drive on a low friction surface and the wheel slip may occur. When the wheel slip occurs, a rotational speed 31 of the wheels 91 and 92 may be different from the vehicle speed 30 according to the rotational force transmitted by the motor 70. In other words, the wheels 91 and 92 may be idle.

Referring to FIG. 4B, an X axis represents a degree of wheel slip occurrence, and a Y axis represents the brake efficiency. As illustrated in FIG. 4B, the braking efficiency during regenerative braking is high when the magnitude of the wheel slip is within a target control region 32. Therefore, when the braking efficiency deviates from the target control region 32, the wheel slip may be reduced by reducing the braking torque, and the braking efficiency may be increased by reducing the wheel slip.

Thus, when the wheel slip is detected, the braking controller 100 may control the driving device 10 such that the motor 70 generates the second regenerative braking torque having the magnitude lower than the first regenerative braking torque.

The braking controller 120 may monitor the degree of wheel slip. The second regenerative braking torque may be generated based on the magnitude of the detected wheel slip. The braking controller 120 may also transmit the second regenerative braking torque to the drive controller 50 to control the motor 70 in accordance with the second regenerative braking torque.

Referring to FIG. 4C, an X axis represents a time and a Y axis represents a magnitude of the braking torque. As described above, when the wheel slip is detected while the motor 70 is operating with the first regenerative braking torque, the vehicle control system 1 may control the motor 70 to generate the second regenerative braking torque having a lower magnitude than the first regenerative braking torque of the motor 70.

Particularly, the braking controller 100 may determine the second regenerative braking torque that is smaller than the first regenerative braking torque and transmit a final regenerative braking torque to the drive controller 50.

A second regenerative braking torque 35 is added to or subtracted from a first regenerative braking torque 33 by a predetermined magnitude 34 based on the braking efficiency.

That is, the second regenerative braking torque 35 is based on the braking efficiency in the target control region 32, which is determined according to the magnitude of the wheel slip detected in FIG. 4B, and may determine the magnitude of the regenerative braking torque during coasting according to the regenerative braking level during coasting. Also, the second regenerative braking torque 35 may vary over time. For example, the second regenerative braking torque 35 may be generated at a slope similar to the first regenerative braking torque 33 to be controlled according to the regenerative braking level.

The braking controller 120 may include a communication module (not shown) communicating with other devices such as the driving device 10, a memory (not shown) storing the algorithm for controlling the braking device 100 or data about the program that implements the algorithm, and a processor (not shown) carrying out the aforementioned operation using the data stored in the memory. The communication module, the memory, and the processor may be implemented in separate chips. Alternatively, the communication module, the memory, and the processor may be implemented in the single chip.

In addition, the braking controller 120 may be provided separately from the drive controller 50, or may be provided integrally with the drive controller 50.

Figure 5:
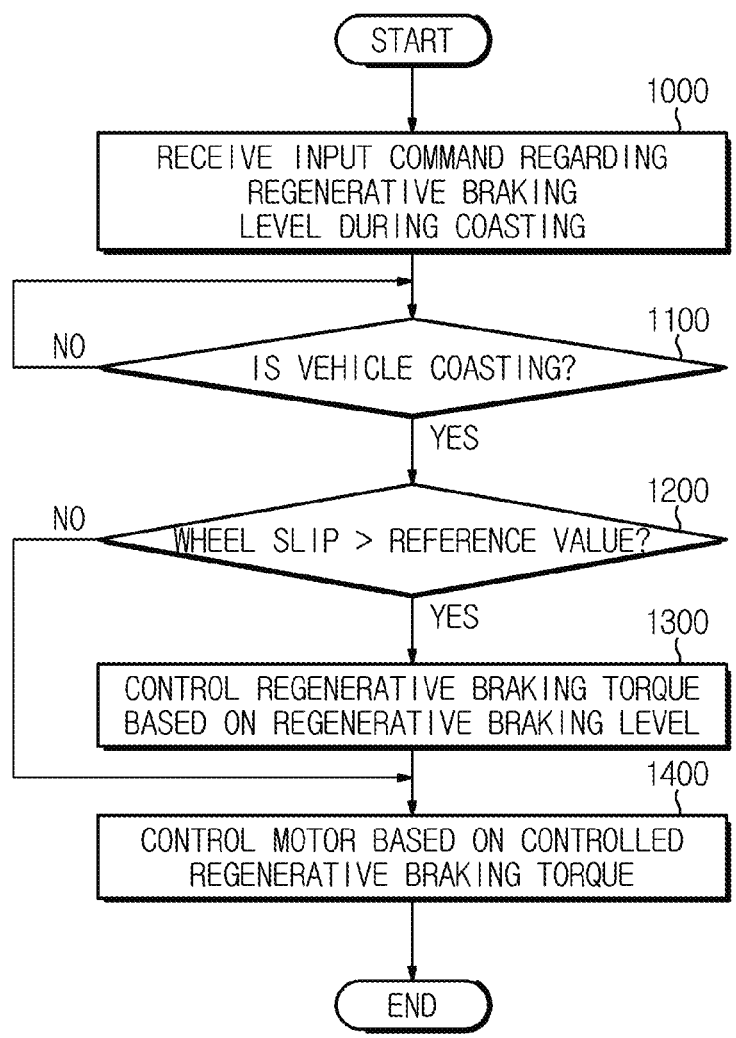
FIG. 5 is a flowchart illustrating a method of controlling the vehicle control system according to embodiments of the disclosure.

FIG. 5 is a flowchart illustrating a method of controlling the vehicle control system according to embodiments of the disclosure.

Referring to FIG. 5, the vehicle control system 1 may receive the input command regarding the regenerative braking level during coasting (1000).

The input command for the regenerative braking level during coasting may be input during driving of the eco-friendly vehicle, or may be received and stored in advance. For example, the regenerative braking level during coasting may be received by the paddle shifters 20 and 21 provided on the steering wheel 12.

The vehicle control system 1 may determine whether the eco-friendly vehicle is coasting during driving (1100).

For example, the vehicle control system 1 may determine it as coasting when the driver does not step on the brake pedal 23 and the accelerator pedal 24 without changing the gear in a D-stage during driving of the vehicle.

When it is determined not to be coasting (NO in 1100), the vehicle control system 1 may continue to determine whether or not coasting is being performed.

When it is determined to be coasting (YES in 1100), the vehicle control system 1 brakes the vehicle with regenerative braking torque according to the regenerative braking level selected by the driver.

Particularly, the drive controller 50 may determine the first regenerative braking torque according to the regenerative braking level selected by the driver, and control the motor 70 according to the determined first regenerative braking torque. The drive controller 50 may also transmit the first regenerative braking torque to the braking controller 120.

The vehicle control system 1 may continue to detect the wheel slip (1200).

First, the vehicle control system 1 may determine whether the wheel slip has occurred through the following Equation 1.

$$\text{slip} = \frac{v - \gamma\omega}{v} \qquad \text{[Equation 1]}$$

Here, the slip is the degree of the wheel slip, v is the vehicle speed, and rw is the rotational speed of the wheel at which the wheel slip occurs.

Further, the vehicle speed may be calculated on the basis of the average rotational speed of the plurality of wheels 91 and 92 provided in the eco-friendly vehicle, and a reference for determining the wheel slip may be determined based on the rotational speed of each wheel provided in the vehicle.

That is, the braking controller 120 may calculate the vehicle speed based on the average rotational speed of the plurality of wheels 91 and 92, and compare the degree of occurrence of the wheel slip, which is calculated based on the calculated vehicle speed and the detected rotational speed of the wheel, with a predetermined reference value to determine whether the wheel slip has finally occurred or not.

The predetermined reference value may have different values based on the vehicle speed, the regenerative braking level, and the state of the road surface. For example, the reference value may be lowered when the current road surface condition is an ice sheet, or an underground parking lot with water.

When the wheel slip exceeds the reference value (YES in 1200), the vehicle control system 1 may determine that the wheel slip has occurred and determine the second regenerative braking torque by controlling the first regenerative braking torque based on the regenerative braking level (1300).

As described above, the regenerative braking torque to be controlled may be controlled based on the braking efficiency and the regenerative braking level input from the driver.

Then, the vehicle control system 1 may control the motor 70 based on the regenerative braking torque, that is, the second regenerative braking torque (1400).

The vehicle control system 1 may improve driving stability and provide safe fun driving for the driver.

According to the vehicle control system of an aspect and the method of controlling the vehicle control system as described above, when a wheel slip occurs during driving, driving stability can be improved by varying and controlling the regenerative braking torque during coasting generated by the motor, thereby providing safe fun driving to the driver.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle control system comprising:
a motor configured to provide a driving force to a wheel;
a wheel sensor configured to detect a rotational speed of the wheel; and
a controller configured to:
receive a regenerative braking level among a plurality of regenerative braking levels,
determine a magnitude of a first regenerative braking torque based on the received regenerative braking level,
control the motor to generate the first regenerative braking torque during coasting,
determine whether a wheel slip of the wheel is out of a predetermined target control region by comparing the wheel slip of the wheel with a predetermined reference value determined based on a vehicle speed, the received regenerative braking level, and a state of a road surface, and
when the wheel slip is detected based on an output of the wheel sensor being out of the predetermined target control region, determine a magnitude of a second regenerative braking torque based on the received regenerative braking level and a difference between the detected wheel slip and a wheel slip of the target control region, and control the motor to generate the second regenerative braking torque, wherein the second regenerative braking torque is lower than the first regenerative braking torque and varied along the slope of the first regenerative braking torque determined based on the plurality of regenerative braking levels.

2. The vehicle control system according to claim 1, further comprising:

an accelerator pedal configured to receive an acceleration command from a driver; and a brake pedal configured to receive a brake command from the driver, wherein the controller is configured to control the motor to generate the first regenerative braking torque when the acceleration command and the brake command are not received.

3. A method of controlling a vehicle control system comprising:

rotating a wheel by a motor;

receiving a regenerative braking level from among a plurality of regenerative braking levels;

determining a magnitude of a first regenerative braking torque based on the received regenerative braking level;

generating the first regenerative braking torque by the motor during coasting;

detecting a rotational speed of the wheel during coasting;

determining whether a wheel slip of the wheel is out of a predetermined target control region by comparing the wheel slip of the wheel with a predetermined reference value determined based on a vehicle speed, the received regenerative braking level, and a state of a road surface;

when the wheel slip is detected based on an output of the wheel sensor being out of the predetermined target control region, determining a magnitude of a second regenerative braking torque based on the received regenerative braking level and a difference between the detected wheel slip and a wheel slip of the predetermined target control region; and generating the second regenerative braking torque by the motor during coasting, wherein the second regenerative braking torque is lower than the first regenerative braking torque and varied along the slope of the first regenerative braking torque determined based on the plurality of regenerative braking levels.

4. The method according to claim 3, wherein the generating of the first regenerative braking torque comprises:

generating the first regenerative braking torque when an acceleration command and a brake command are not received.

5. A braking device of braking a vehicle comprising a motor configured to drive a wheel and a driving device configured to control the motor, the braking device comprising:

a wheel sensor configured to detect a rotational speed of the wheel; and a controller configured to:

receive information about a first regenerative braking torque from the driving device during coasting;

determine a magnitude of a first regenerative braking torque based on the received regenerative braking level, determine a wheel slip of the wheel based on an output of the wheel sensor;

determine whether the wheel slip of the wheel is out of a target control region by comparing the wheel slip of the wheel with a predetermined reference value determined based on a vehicle speed, the received regenerative braking level, and a state of a road surface;

when the wheel slip is detected as being out of the predetermined target control region, determine a magnitude of a second regenerative braking torque based on the received regenerative braking level and a difference between the detected wheel slip and a wheel slip of the target control region; and transmit information about the second regenerative braking torque to the driving device such that the motor generates the second regenerative braking torque, wherein the second regenerative braking torque is lower than the first regenerative braking torque in response to the determination of the wheel slip and varied along the slope of the first regenerative braking torque determined based on the plurality of regenerative braking levels.

* * * * *